(12) United States Patent
Woo et al.

(10) Patent No.: US 11,112,890 B2
(45) Date of Patent: Sep. 7, 2021

(54) STYLUS PEN

(71) Applicant: HiDeep Inc., Seongnam-si (KR)

(72) Inventors: Hyoungwook Woo, Seongnam-si (KR);
Kiryoung Jung, Seongnam-si (KR);
Seyeob Kim, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 0 days.

(21) Appl. No.: 16/835,515

(22) Filed: Mar. 31, 2020

(65) Prior Publication Data

US 2020/0310564 A1   Oct. 1, 2020

(30) Foreign Application Priority Data

Apr. 1, 2019   (KR) .......................... 10-2019-0037988

(51) Int. Cl.
*G06F 3/0354* (2013.01)
*G06F 3/038* (2013.01)
*G06F 3/044* (2006.01)

(52) U.S. Cl.
CPC .......... *G06F 3/03545* (2013.01); *G06F 3/038* (2013.01); *G06F 3/0441* (2019.05); *G06F 3/0442* (2019.05)

(58) Field of Classification Search
CPC .... G06F 3/03545; G06F 3/038; G06F 3/0441; G06F 3/0442; G06F 3/046
See application file for complete search history.

(56) References Cited

U.S. PATENT DOCUMENTS

| | | | | |
|---|---|---|---|---|
| 2013/0300708 | A1* | 11/2013 | Kim | G06F 3/0442 345/174 |
| 2014/0132529 | A1* | 5/2014 | Jeong | G06F 3/03545 345/173 |
| 2015/0097806 | A1* | 4/2015 | Jeong | G06F 3/03545 345/174 |
| 2016/0147320 | A1* | 5/2016 | Krumpelman | G06F 3/044 345/179 |
| 2017/0277284 | A1* | 9/2017 | Kim | G06F 3/03545 |
| 2017/0285771 | A1* | 10/2017 | Jung | G06F 3/0442 |
| 2018/0018028 | A1* | 1/2018 | Lee | G06F 3/03545 |
| 2018/0024652 | A1* | 1/2018 | Lin | G06F 3/0442 345/174 |
| 2019/0129522 | A1* | 5/2019 | Schwitzer | H05K 3/0014 |
| 2019/0212837 | A1* | 7/2019 | Wong | G06F 3/03545 |

FOREIGN PATENT DOCUMENTS

| | | |
|---|---|---|
| KR | 10-2005-0005542 | 1/2005 |
| KR | 10-2011-0002073 | 1/2011 |
| KR | 10-1429925 | 8/2014 |
| KR | 10-2015-0054488 | 5/2015 |
| KR | 10-2016-0083693 | 7/2016 |

OTHER PUBLICATIONS

KIPO, PCT Search Report & Written Opinion of PCT/KR2020/004419 dated Jul. 8, 2020.

* cited by examiner

*Primary Examiner* — Hong Zhou

(74) *Attorney, Agent, or Firm* — Lex IP Meister, PLLC

(57) ABSTRACT

An exemplary embodiment of the present invention provides a stylus pen including: a housing; a conductive tip configured to have at least a portion that is exposed to an exterior of the housing; a resonance circuit disposed in the housing to be connected to the conductive tip and to resonate an electrical signal transferred from the conductive tip; and a conductive blocking member disposed to correspond to a portion of the housing in which the conductive tip is exposed to the exterior.

8 Claims, 22 Drawing Sheets

(b)

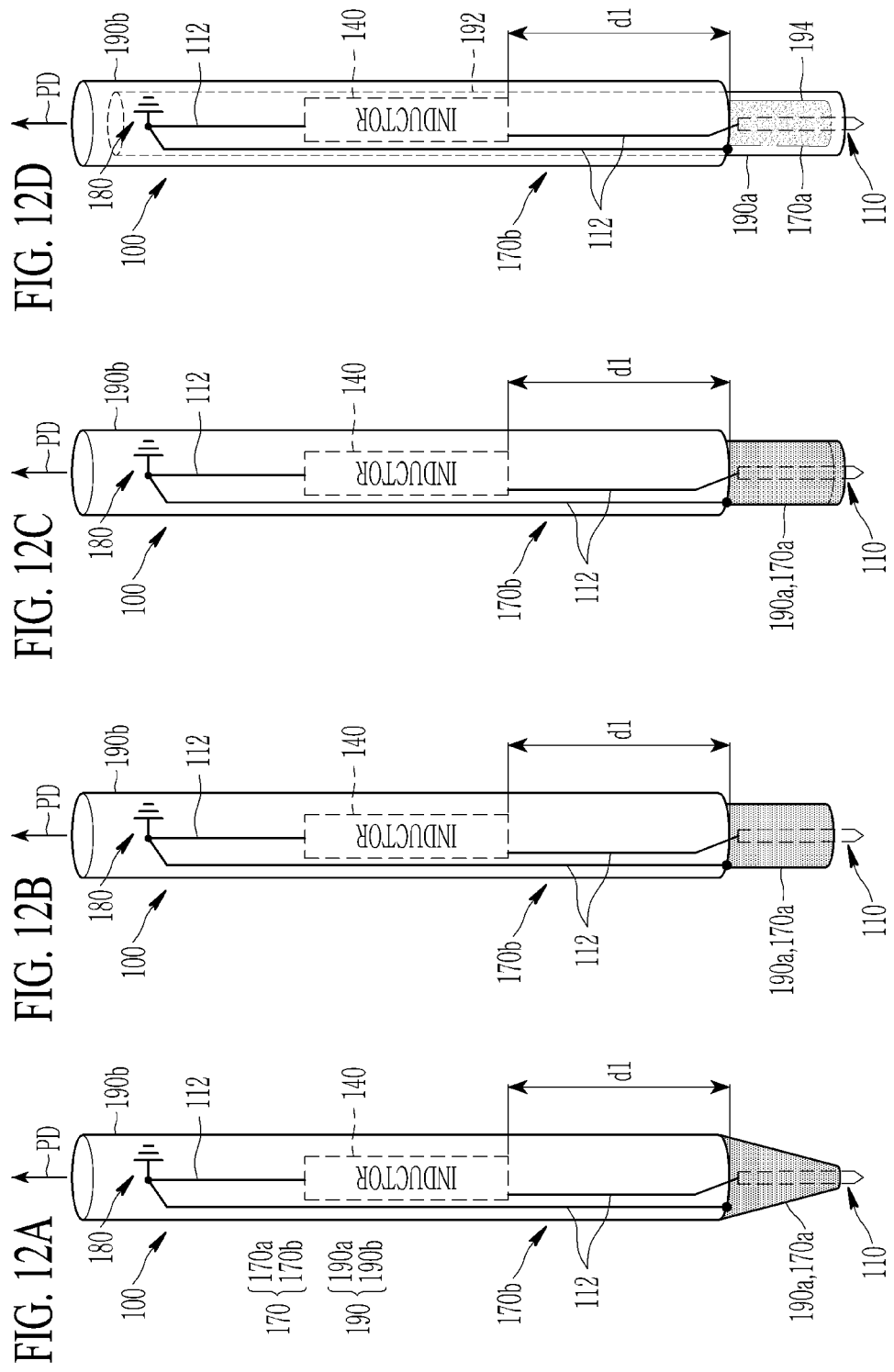

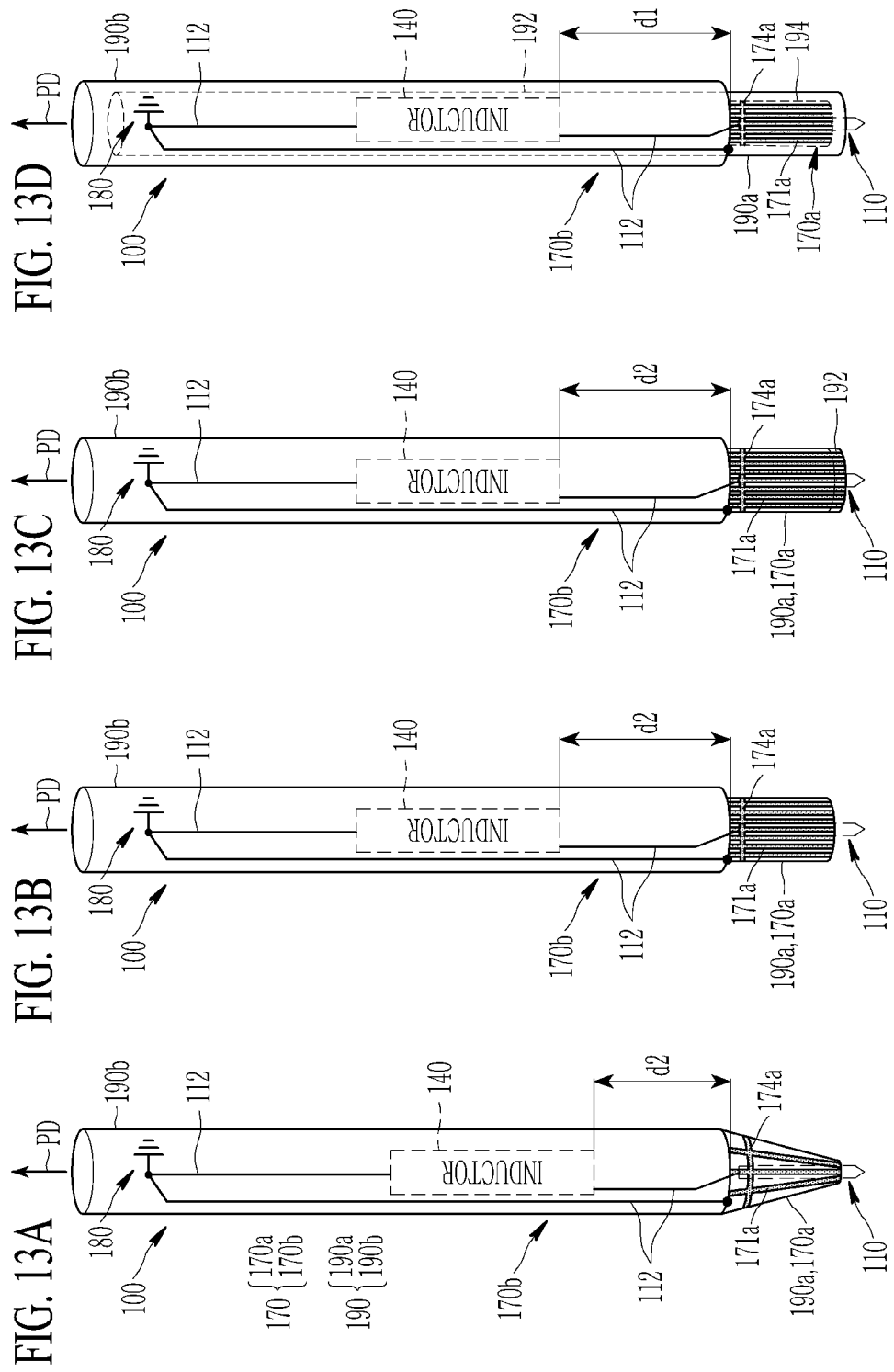

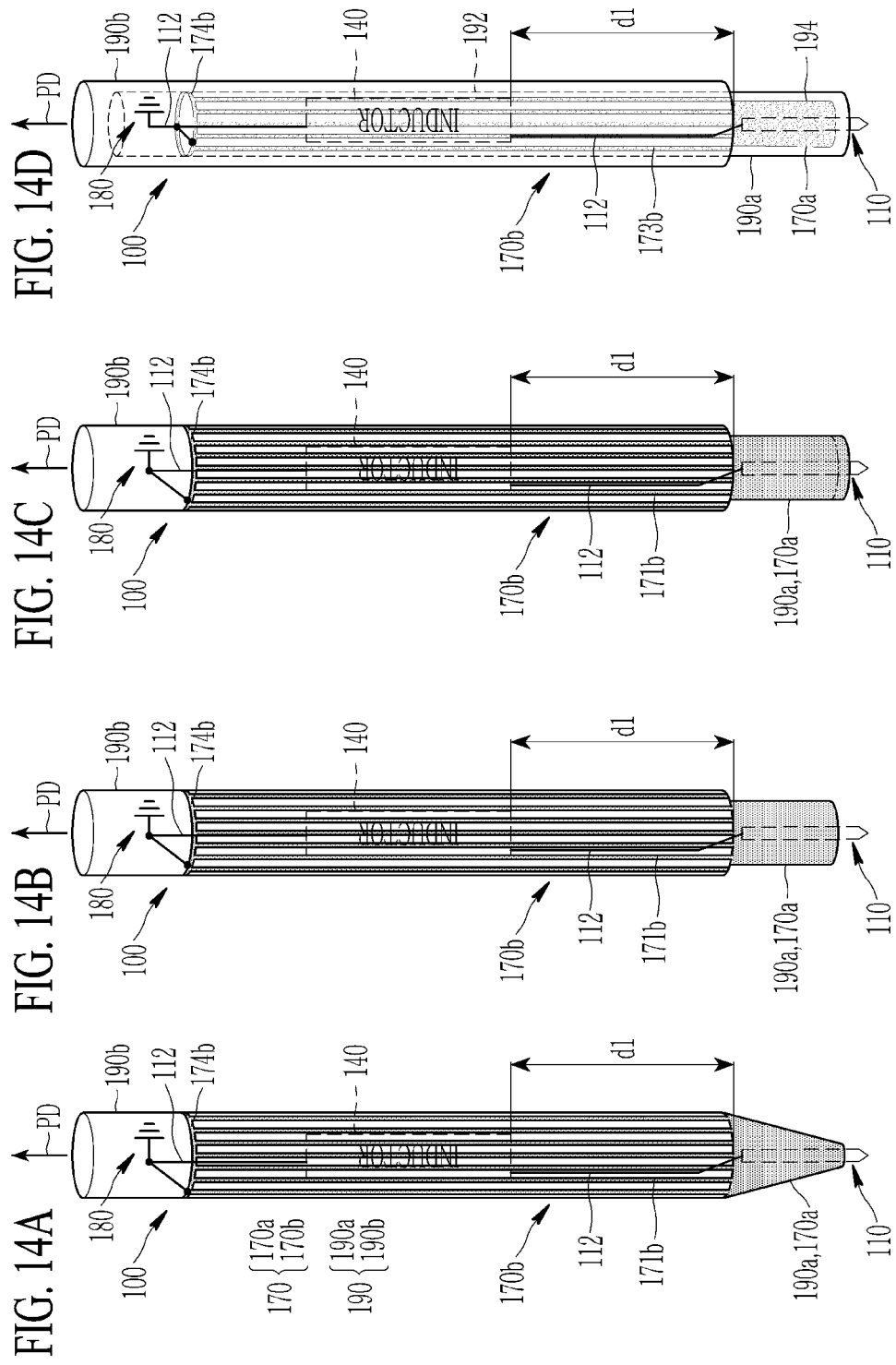

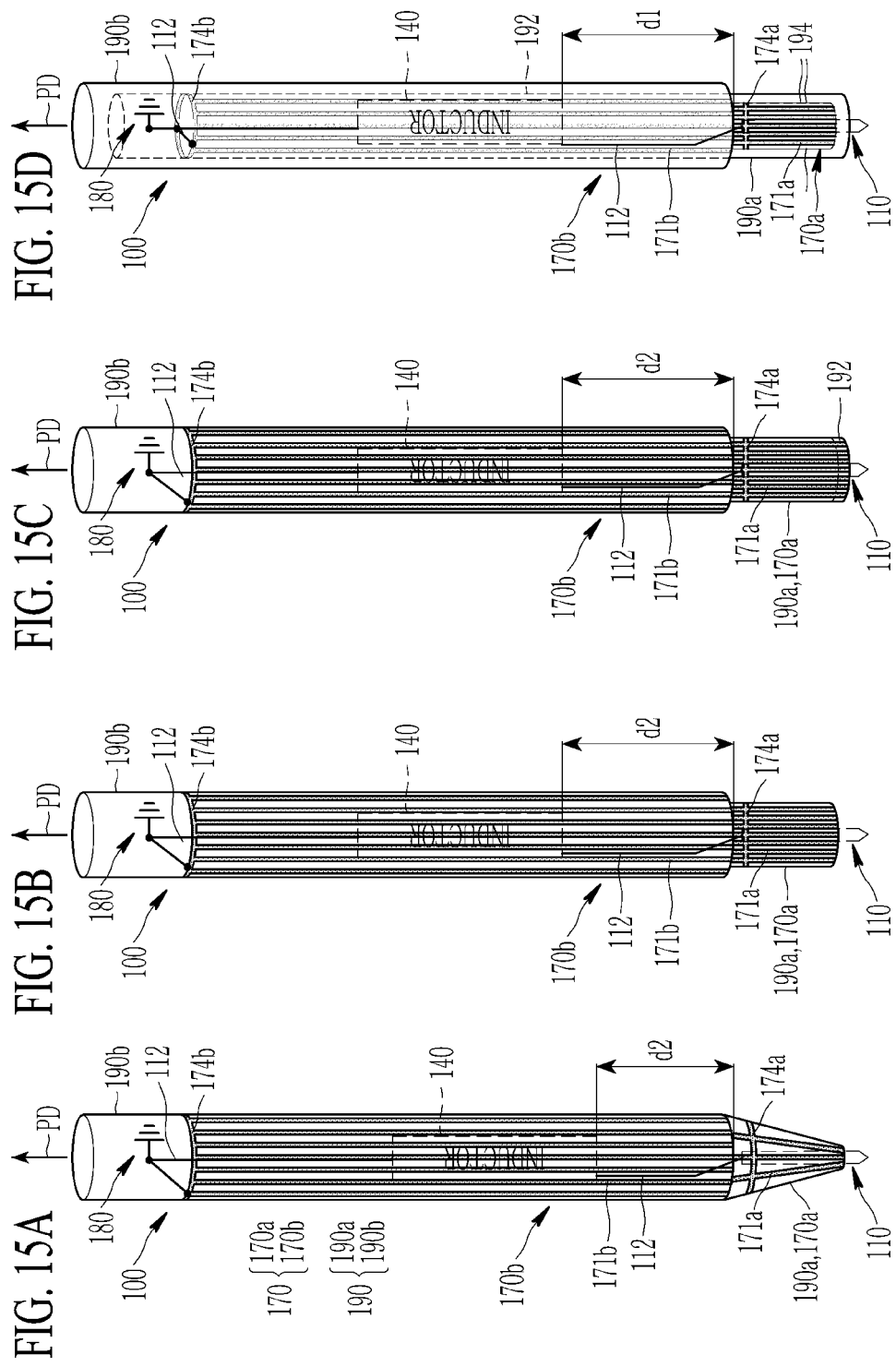

STYLUS PEN

CROSS-REFERENCE TO RELATED APPLICATION

This application claims priority to and benefits of Korean Patent Application No. 10-2019-0037988, filed in the Korean Intellectual Property Office on Apr. 1, 2019, the entire contents of which are incorporated herein by reference.

BACKGROUND OF THE INVENTION (a) Field of the Invention

The present disclosure relates to a stylus pen.

(b) Description of the Related Art

Various terminals such as mobile phones, smart phones, tablet PCs, laptop computers, digital broadcasting terminals, PDAs (personal digital assistants), PMPs (portable multimedia players), and navigation devices include touch sensors.

In such a terminal, a touch sensor may be disposed on a display panel displaying an image, or may be disposed in an area of a terminal body. As a user interacts with the terminal by touching the touch sensor, the terminal may provide the user with an intuitive user interface.

The user may use a stylus pen for sophisticated touch input. The stylus pen may transmit and receive signals to and from the touch sensor in an electrical and/or magnetic manner.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments have been made in an effort to provide a stylus pen that resonates with a signal transferred from a touch sensor.

Exemplary embodiments have been made in an effort to provide a stylus pen that transfers an appropriately sized signal to a touch sensor.

Exemplary embodiments have been made in an effort to provide a stylus pen in which a resonance frequency can be maintained.

An exemplary embodiment of the present invention provides a stylus pen including: a housing; a conductive tip configured to have at least a portion that is exposed to an exterior of the housing; a resonance circuit disposed in the housing to be connected to the conductive tip and to resonate an electrical signal transferred from the conductive tip; and a conductive blocking member disposed to correspond to a portion of the housing in which the conductive tip is exposed to the exterior.

The blocking member may be a single conductive plate.

The portion of the housing may include a non-conductive holder portion, the blocking member may be disposed in correspondence with the holder portion and may include a slit for blocking generation of an eddy current, opposite ends of the blocking member may be spaced apart from each other in a first direction by the slit, and the first direction may be the direction in which the eddy current is generated.

The blocking member may further include a connector connecting opposite ends of the blocking member, the stylus pen may further include a ground portion connected with the blocking member and electrically connected to a user, and the connector may be electrically connected to the ground portion.

The blocking member may be disposed between a first area 0.1 mm away from an opening of the housing where the conductive tip is exposed to the outside and a second area 20 mm away from the opening.

The portion of the housing may include a non-conductive holder portion, the blocking member may be disposed in correspondence with the holder portion to include a plurality of first blocking units spaced apart from each other along a first direction and extending along a second direction that is perpendicular to the first direction, the first direction may be a direction in which an eddy current is generated, and the plurality of first blocking units may be conductive.

The blocking member may further include a connector connecting the first blocking units, the stylus pen may further include a ground portion connected with the blocking member and electrically connected to a user, and the connector may be electrically connected to the ground portion.

The portion of the housing may include a non-conductive holder portion, the blocking member may be disposed in correspondence with the holder portion to include a plurality of second blocking units extending in a first direction and spaced apart in a second direction that is perpendicular to the first direction, the first direction may be a direction in which an eddy current is generated, and opposite ends of each of the second blocking units may be spaced apart along the first direction.

The stylus pen may further include a ground portion connected with the blocking member and electrically connected to a user, and the resonance circuit may include an inductor portion connected between the conductive tip and the ground portion and a capacitor portion connected between the conductive tip and the ground portion.

The blocking member may further surround at least a portion of the inductor portion.

The portion of the housing may include a non-conductive holder portion and a non-conductive body portion spaced apart from the conductive tip, a first portion of the blocking member, adjacent to the conductive tip, may be positioned to correspond to the holder portion, and is a conductive plate, a second portion of the blocking member, surrounding at least a portion of the inductor portion, may be positioned to correspond to the body portion, and includes one slit for blocking generation of an eddy current, opposite ends of the second portion of the blocking member may be spaced apart from each other in a first direction by the slit, and the first direction may be the direction in which the eddy current is generated.

The portion of the housing may include a non-conductive holder portion, the housing may further include a non-conductive body portion spaced from the conductive tip, a first portion of the blocking member, adjacent to the conductive tip, may be positioned to correspond to the holder portion, and may include a first slit for blocking generation of an eddy current, a second portion of the blocking member, surrounding at least a portion of the inductor portion, is positioned to correspond to the body portion, and includes a second slit for blocking generation of an eddy current, opposite ends of the first portion of the blocking member may be spaced along the first direction by the first slit, and opposite ends of the second portion of the blocking member may be spaced along the first direction by the second slit, and the first direction may be the direction in which the eddy current is generated.

The portion of the housing may include a non-conductive holder portion, the housing may further include a non-conductive body portion spaced from the conductive tip, a first portion of the blocking member, adjacent to the conductive tip, may be positioned in correspondence with the holder portion to include a plurality of first blocking units spaced apart from each other along a first direction and extending along a second direction that is perpendicular to the first direction, a second portion of the blocking member, surrounding at least a portion of the inductor portion, may be positioned to correspond to the body portion, and includes a plurality of third blocking units spaced apart from each other along the first direction and extending along the second direction perpendicular to the first direction, the first direction may be a direction in which an eddy current is generated, and the first blocking units and the third blocking units may be conductive.

The inductor portion may include a ferrite core, and a conductive coil connected to the conductive tip and wound around the ferrite core.

The blocking member may be disposed on an inner surface of the housing.

The blocking member may be disposed on an outer surface of the housing.

The blocking member may be disposed between the inner and outer surfaces of the housing.

The blocking member may include a sheet in which a plurality of conductive blocking units are printed.

The blocking member may include a plurality of blocking units plated on the housing.

The effects of the stylus pen according to the present disclosure will be described as follows.

According to at least one of the exemplary embodiments of the present disclosure, it is possible to provide a stylus pen that is robust against external factors.

According to at least one of the exemplary embodiments of the present disclosure, it is possible to provide a stylus pen that prevents unintentional touch input.

According to at least one of the exemplary embodiments of the present disclosure, it is possible to provide a stylus pen for improving touch sensitivity of a touch sensor.

The additional range of applicability of the present disclosure will become apparent from the following detailed description. However, since various modifications and alternatives within the spirit and scope of the present disclosure may be clearly understood by those skilled in the art, it is to be understood that a detailed description and a specific exemplary embodiment of the present invention are provided only by way of example.

BRIEF DESCRIPTION OF THE DRAWINGS

FIG. 12A to FIG. 12D, FIG. 13A to FIG. 13D, FIG. 14A to FIG. 14D, and FIG. 15A to FIG. 15D illustrate schematic views showing a structure of a stylus pen according to exemplary embodiments.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

In addition, unless explicitly described to the contrary, the word "comprise" and variations such as "comprises" or "comprising" will be understood to imply the inclusion of stated elements but not the exclusion of any other elements.

Figure 1:
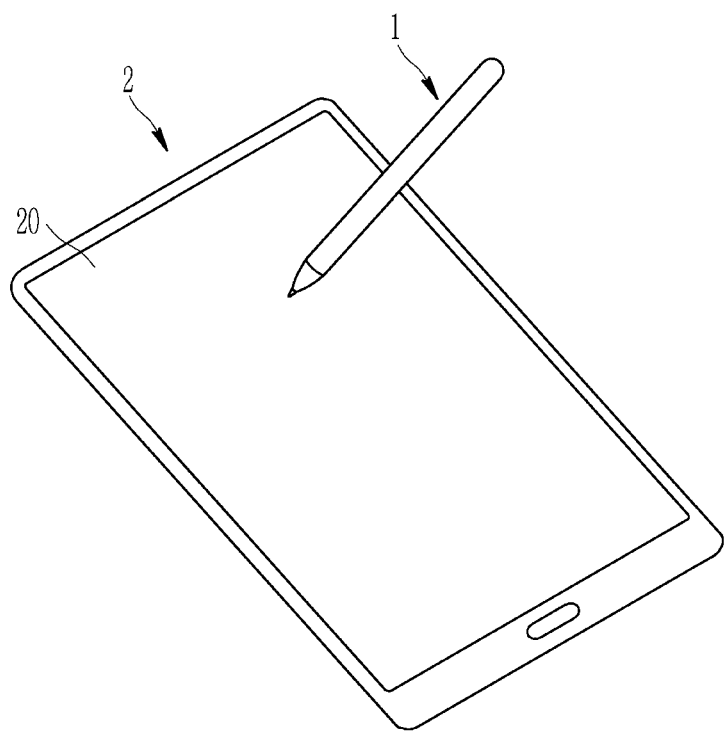
FIG. 1 illustrates a schematic view showing a stylus pen and an electronic device.
Figure 2:
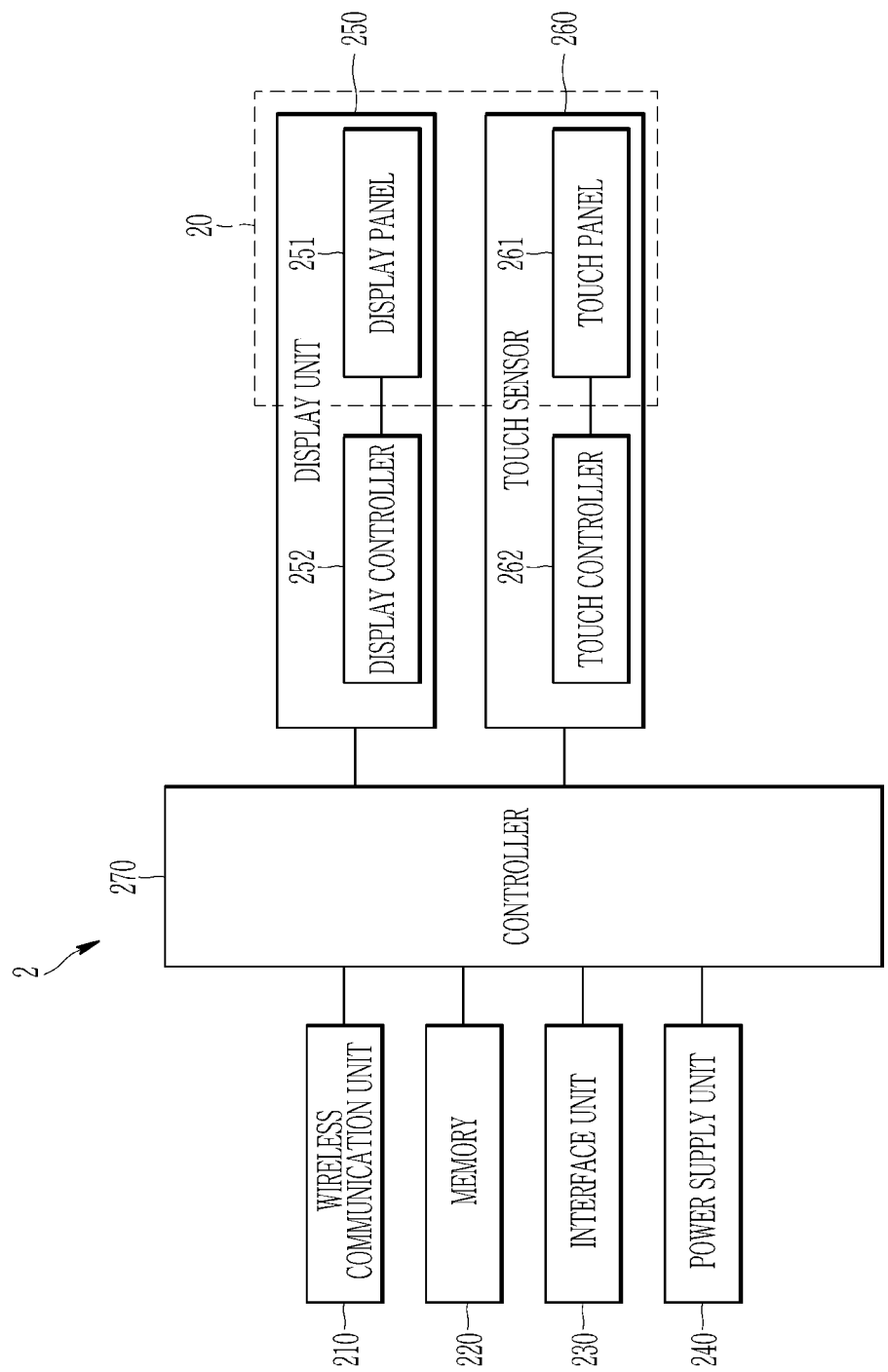
FIG. 2 is a block diagram schematically showing the electronic device.

FIG. 1 illustrates a schematic view showing a stylus pen and an electronic device, and FIG. 2 is a block diagram schematically showing the electronic device.

The electronic device 2 may include at least one of a portable communication device (e.g., a smartphone or a tablet PC), a computer device, a portable multimedia device, a portable medical device, a wearable device, and a consumer electronic device. In addition, the electronic device 2 may be a flexible device or a flexible display device.

The electronic device 2 may include a wireless communication unit 210, a memory 220, an interface unit 230, a power supply unit 240, a display unit 250, a touch sensor 260, a controller 270, and the like. The constituent elements illustrated in FIG. 1 are not essential for implementing the terminal, so the terminal described in the present disclosure may include more or less constituent elements than the foregoing listed constituent elements.

Specifically, among the constituent elements, the wireless communication unit 210 may include at least one module that enables wireless communication between the electronic device 2 and the wireless communication system, between the terminal 2 and another electronic device 2, or between the electronic device 2 and an external server. In addition, the wireless communication unit 210 may include at least one module for connecting the electronic device 2 to at least one network.

In addition, the memory 220 stores data supporting various functions of the electronic device 2. The memory 220 may store a plurality of application programs (or applications), data for operating the electronic device 2, and commands, which are driven in the electronic device 2.

The interface unit 230 serves as a passage of various kinds of external devices connected with the electronic device 2. The interface unit 230 may include at least one of a wired/wireless headset port, an external charger port, a wired/wireless data port, a memory card port, a port for connection with a device equipped with an identification module, an audio input/output (I/O) port, a video input/output (I/O) port, and an earphone port.

The power supply unit 240 receives power from an external power source and an internal power source, and supplies the power from the power source to each constituent element included in the electronic device 2 under the control of the control unit 270. The power supply unit 240 includes a battery, and the battery may be an embedded battery or a replaceable battery.

The display unit 250 displays (outputs) information processed by the electronic device 2. For example, the display unit 250 may display execution image information of an application program driven in the electronic device 2, or user interface (UI) and graphical user interface (GUI) information according to the execution image information.

The display unit 250 may include a liquid crystal display (LCD), an organic light emitting diode (OLED) display, an e-ink display, and the like.

The display unit 250 includes a display panel 251 for displaying an image, and a display controller 252 connected to the display panel 251 to supply signals for displaying an image to the display panel 251. For example, the display panel 251 may include a plurality of pixels connected to signal lines such as a plurality of scan lines and a plurality of data lines, and a scan driver for supplying a scan signal to the scan lines, and the display controller 252 may include a data driver IC for generating a data signal applied to a data line, a timing controller for controlling an overall operation of the display unit 250 by processing an image signal, and a power management IC.

The touch sensor 260 senses a touch (or touch input) applied to a touch area by using a capacitive method. As an example, the touch sensor 260 may be configured to convert a change in capacitance, voltage, current, or the like, which are generated in a specific portion, into an electrical input signal. The touch sensor 260 may be configured to detect a position, an area, a capacitance at the touch, and the like, when a touch object that applies a touch onto a touch area is touched on the touch sensor 260. Herein, the touch object indicates an object applying a touch to the touch sensor, and may be, e.g., a body part of a user (finger, palm, etc.), a passive or active stylus pen 1, or the like.

The touch sensor 260 includes a touch panel 261 in which a touch electrode is disposed, and a touch controller 262 configured to transfer touch data to the controller 270 and/or the display controller 252 by applying a driving signal to the touch panel 261 and receiving a detection signal from the touch panel 261.

The touch controller 262 may include a driver connected to a plurality of first touch electrodes and a plurality of second touch electrodes to apply a driving signal, a receiver connected to the first touch electrodes and the second touch electrodes to receive a detection signal, and a microcontrol unit (MCU) configured to control operations of the driver and the receiver and to obtain a touch position by using the detection signal outputted from the receiver.

The display panel 251 and the touch panel 261 may be referred to as a touch screen 20 by forming a mutual layer structure or being integrally formed.

The controller 270 typically controls a general operation of the electronic device 2 in addition to the operation related to the application program. The controller 270 processes the input or output signal, data, information, and the like, or drives the application program stored in the memory 220 through the foregoing constituent elements, thereby providing the user with or processing the appropriate information or function.

Further, the controller 270 may control at least a part of the constituent elements described with reference to FIG. 2 in order to drive the application program stored in the memory 220. In addition, the controller 270 may combine two or more of the constituent elements included in the electronic device 2 and operate the combined constituent elements for driving the application program.

Figure 3:
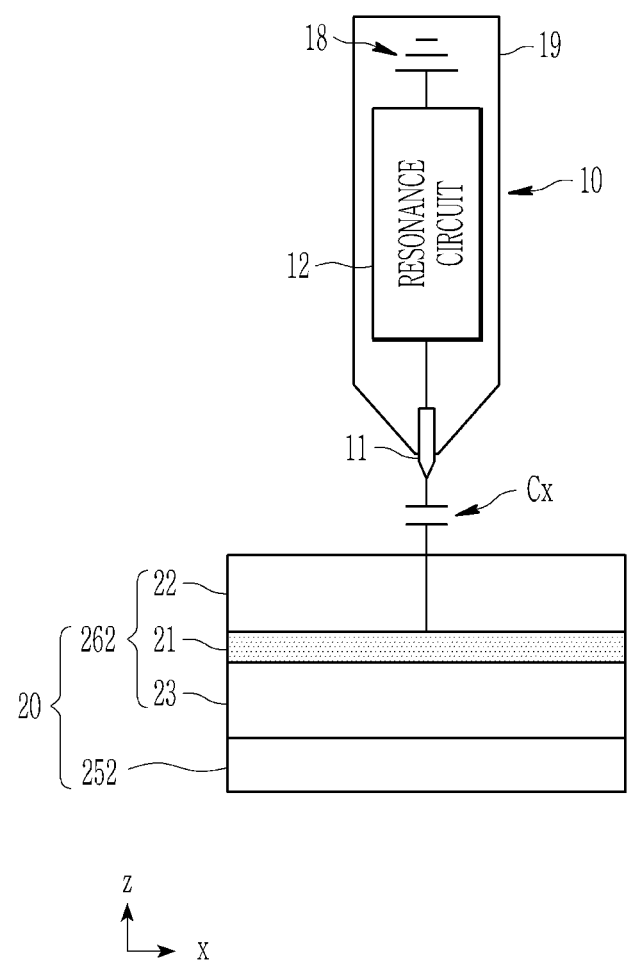
FIG. 3 illustrates a state where a stylus pen is close to an electronic device.
Figure 4:
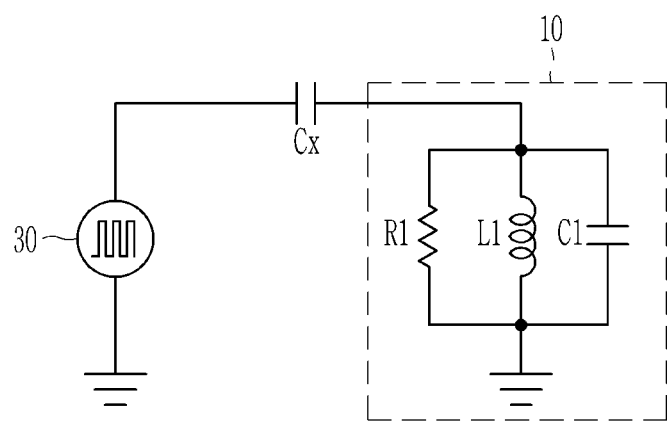
FIG. 4 illustrates a schematic circuit diagram showing a stylus pen and an electronic device.
Figure 5:
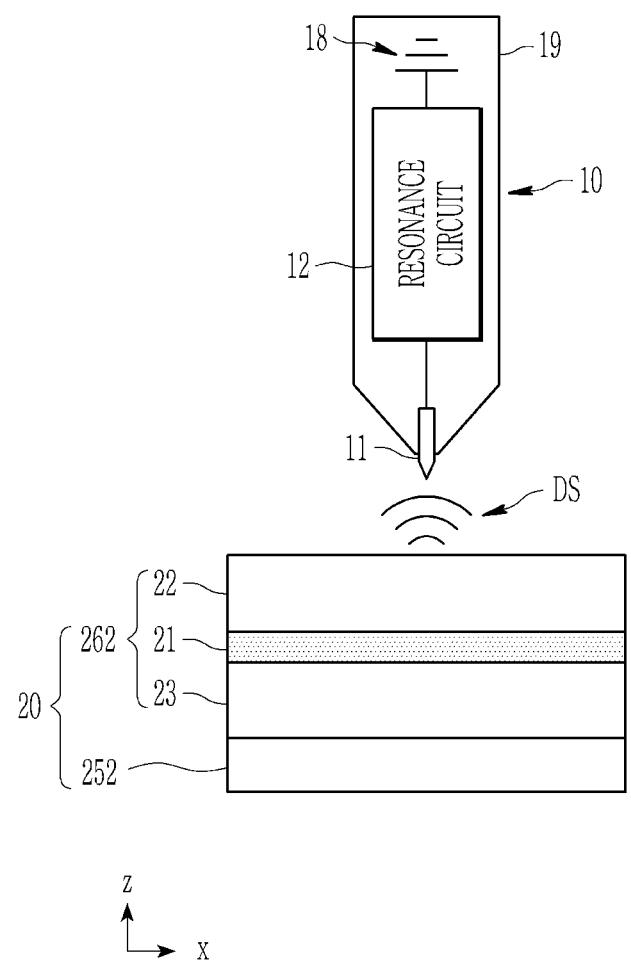
FIG. 5 and FIG. 6 are views illustrating a state in which a stylus pen is close to an electronic device to transmit and receive a signal.
Figure 6:
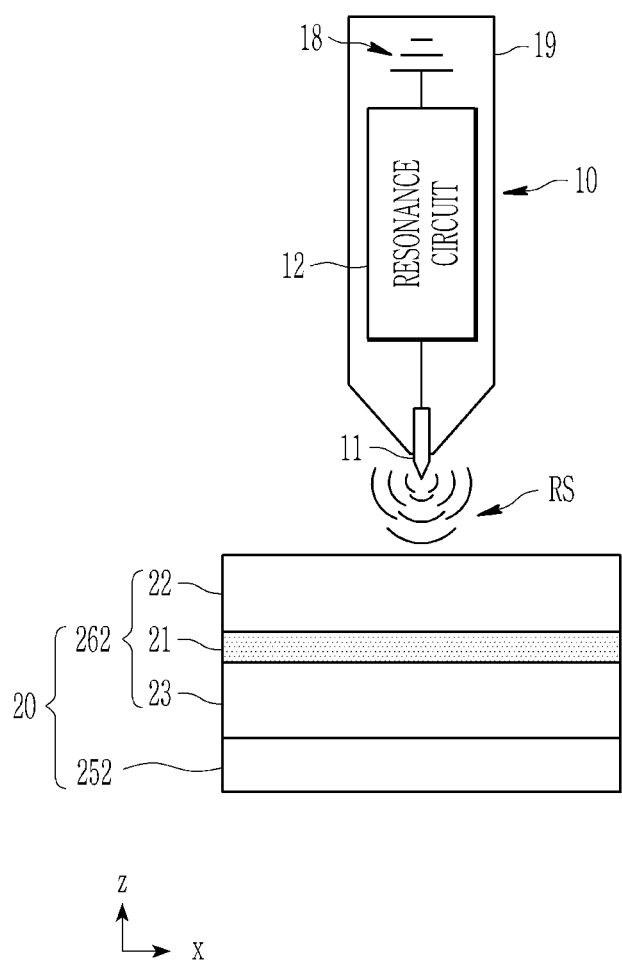

FIG. 3 illustrates a state where a stylus pen is close to an electronic device, FIG. 4 illustrates a schematic circuit diagram showing a stylus pen and an electronic device, and FIG. 5 and FIG. 6 are views illustrating a state in which a stylus pen is close to an electronic device to transmit and receive a signal.

As illustrated in FIG. 3, a stylus pen 10 and a touch screen 20 may be close to each other.

The stylus pen 10 may include a conductive tip 11, a resonance circuit 12, a ground portion 18, and a housing (e.g., a case, a frame, a cover, etc.) 19.

The conductive tip 11 is electrically connected with the resonance circuit 12. At least a portion of the conductive tip 11 may be formed of a conductive material (e.g., a metal, conductive rubber, a conductive fabric, a conductive silicone, etc.), but the present invention is not limited thereto.

The resonance circuit 12, which is an LC resonance circuit, may resonate with a driving signal outputted from the touch screen 20. The driving signal may include a signal (e.g., a sine wave, a square wave, etc.) having a frequency corresponding to a resonance frequency of the resonance circuit 12. The resonance frequency of the stylus pen 10 depends on a design value of a resonance circuit 12 of the stylus pen 10. For resonance, a resonance frequency of the resonance circuit 12 and a frequency of the driving signal must be the same or very similar. When the touch electrode 21 generates an electric field by the driving signal, the resonance circuit 12 of the stylus pen 10 resonates using a signal received through a change of the electric field.

A resonance signal generated when the resonance circuit 12 resonates with the driving signal may be outputted to the touch screen 20 through the conductive tip 11. The resonance signal caused by the resonance may be outputted to the touch screen 20 through the conductive tip 11 during the period in which the driving signal is inputted into the touch electrode 21 and a period thereafter. The resonance circuit 12 is disposed in the housing 19, and is electrically connected to the ground portion 18.

In this manner, the stylus pen 10 may generate a touch input by generating a resonance signal in response to a driving signal applied to the touch electrode 21.

The housing 19 may accommodate elements of the stylus pen 10. The housing may have a cylindrical shape, a polygonal shape, a column shape having at least part of a shape of a curved surface, an entasis, a frustum of a pyramid, a circular truncated cone, or the like, but it is not limited thereto. Since the housing 19 is empty inside, the housing 19 may accommodate the conductive tip 11, the resonance circuit 12, and the ground portion 18 therein. The housing 19 may be made of a non-conductive material.

The touch screen 20 includes a display panel 251 and a touch panel 261 on the display panel 251. The touch panel 261 may include a substrate 23, a touch electrode 21 on the substrate 23, and a window 22 on the touch electrode 21.

The substrate 23 may be an encapsulation substrate of the display panel 251, which may be implemented by a transparent material.

The touch electrode 21 may include a plurality of first touch electrodes each having a shape extending in a first direction and arranged in a second direction crossing the first direction, and a plurality of second touch electrodes each having a shape extending in the second direction and arranged in the second direction. Although the touch electrode 21 is illustrated as one layer in FIG. 3, the first touch electrode and the second touch electrode may be disposed on different layers from each other, but the present invention is not limited thereto.

The window 22 may be disposed on the touch electrode 21. The touch electrode 21, the conductive tip 11, and the window 22 may constitute a capacitor Cx. Therefore, a driving signal applied to the touch electrode 21 may be transferred to the stylus pen 10, and the resonance signal generated at the stylus pen 10 may be transferred to the touch electrode 21.

As illustrated in FIG. 4, the stylus pen 10 of FIG. 3 may be represented by an equivalent circuit including a resistor R1, an inductor L1, and a capacitor C1.

A driving signal 30 having a predetermined frequency through the capacitor Cx is transferred to the stylus pen 10 through the touch electrode 21. Then, the resonance circuit 12 including the inductor L1 and the capacitor C1 of the stylus pen 10 may resonate with the driving signal 30.

As illustrated in FIG. 5, a driving signal DS from the touch electrode 21 may be transferred to the conductive tip 11 even when the stylus pen 10 is not in direct contact with the window 22 (i.e., hovered).

Similarly as illustrated in FIG. 6, a resonance signal RS may be transferred from the conductive tip 11 toward the touch electrode 21 through the atmosphere or the non-conductive housing 19.

That is, even when the stylus pen 10 is hovered, the touch controller 262 may receive the detection signal by the resonance signal RS transferred to the touch electrode 21. When the touch controller 262 generates touch data depending on the detection signal, touch data not intended by a user may be generated, or touch data that is incorrect or unstable may be generated.

A touch input by the transfer of the resonance signal RS in the hovering state will be described with reference to FIG. 7A and FIG. 7B.

Figure 7A:
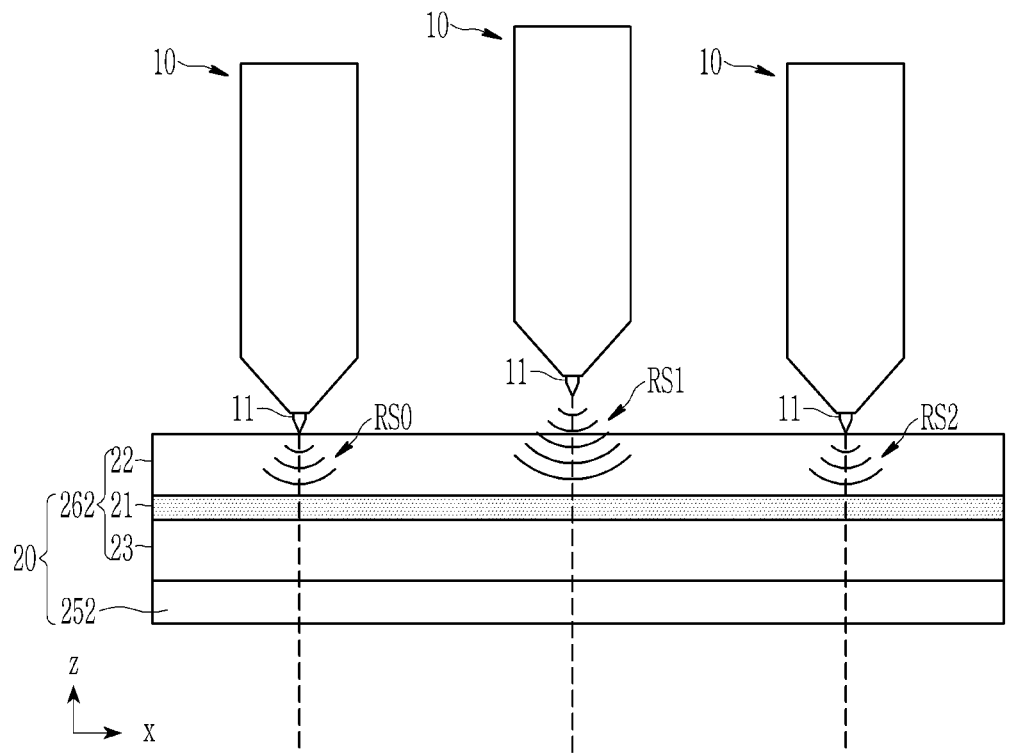
FIG. 7A and FIG. 7B illustrate touch inputs by hovering a stylus pen.
Figure 7B:
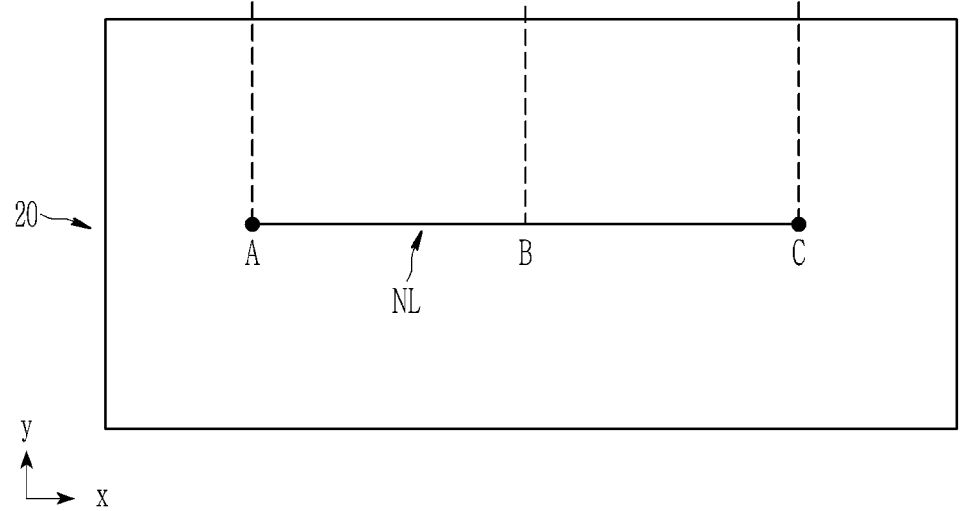

FIG. 7A and FIG. 7B illustrate touch inputs by hovering a stylus pen. For example, in writing, the stylus pen 10 may move from an end point A of a previous stroke to a start point C of a next stroke in the touch screen 20 to write the previous stroke and then the next stroke.

The conductive tip 11 of the stylus pen 10 contacts the window 22 at one point (first point) A and also contacts the window 22 at another point (second point) C. Resonance signals RS0 and RS2 from the conductive tip 11 which is in contact with the window 22 may be transferred to the touch electrode 21. Touch data corresponding to the first point A is generated by the resonance signal RS0, and touch data corresponding to the second point C is generated by the resonance signal RS2.

The stylus pen 10 is spaced apart from the window 22 in a region B between the first point A and the second point B. That is, the stylus pen 10 is hovered in the area B. The resonance signal RS0 from the conductive tip 11 of the stylus pen 10 in the hovering state may be transferred to the touch electrode 21. Touch data corresponding to a connection stroke NL of the area B is generated by the resonance signal RS1. That is, when the touch controller 262 generates touch data according to the resonance signal RS1 transferred from the hovered stylus pen 10, the touch data corresponding to the connection stroke which is not intended by a user is generated and displayed on the touch screen 20.

Exemplary embodiments provide a stylus pen that prevents resonance signal transmission from a hovered stylus pen.

On the one hand, the user grips the stylus pen 10 and touches the touch screen 20 with the conductive tip 11. This will be described with reference to FIG. 8A, FIG. 8B, and FIG. 9.

Figure 8A:
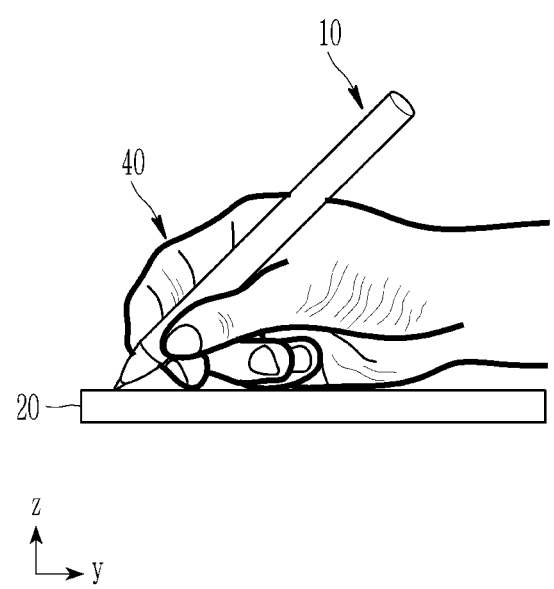
FIG. 8A and FIG. 8B illustrate schematic views showing a stylus pen and an electronic device when the stylus pen is held.
Figure 8B:
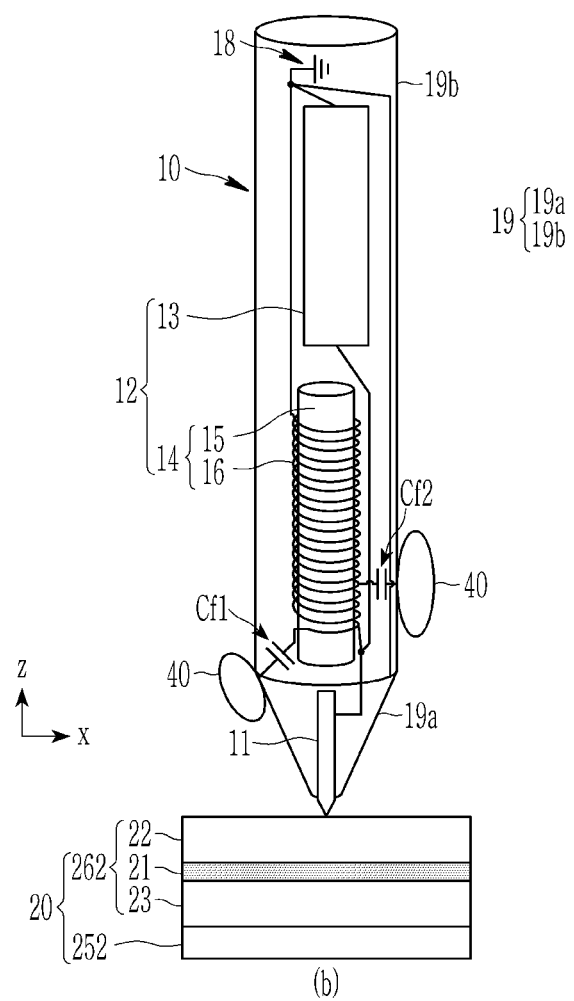
Figure 9:
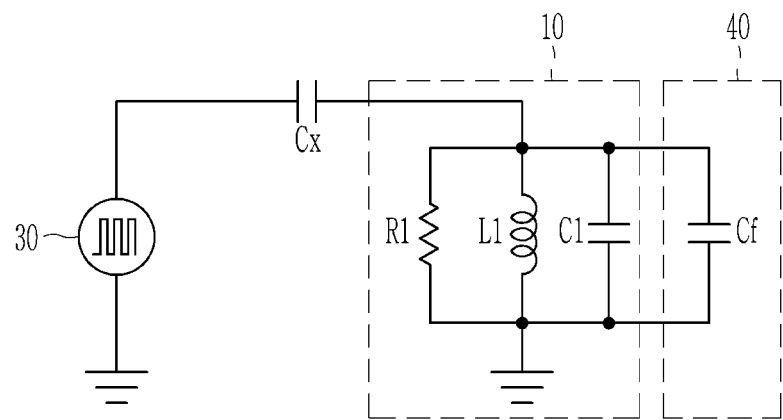
FIG. 9 illustrates a schematic circuit diagram illustrating a stylus pen and an electronic device when the stylus pen is held.

FIG. 8A and FIG. 8B illustrate schematic views showing a stylus pen and an electronic device when the stylus pen is held, and FIG. 9 illustrates a schematic circuit diagram illustrating a stylus pen and an electronic device when the stylus pen is held.

As illustrated in FIG. 8A, a user 40 grips the stylus pen 10 and allows a tip of the stylus pen 10 to contact the touch screen 20 to input a touch.

As illustrated in FIG. 8B, the stylus pen 10 includes a conductive tip 11, a resonance circuit 12 connected to the conductive tip 11, a ground portion 18, and a housing 19. The resonance circuit 12 includes a capacitor portion 13 and an inductor portion 14. The housing 19 includes a holder portion 19a adjacent the tip 11 and a body portion 19b spaced apart from the tip 11.

The inductor portion 14 includes a ferrite core 15 and a coil 16 that is wound around the ferrite core 15. The inductance of the inductor portion 14 is proportional to the magnetic coefficient μ, a cross-sectional area S of the coil 16, and a square of the number of turns N, and is inversely proportional to a length 1 of the coil 16, by $L=\mu S N^2/1$.

The stylus pen 10 may be gripped by a user's finger 40, and at this time, parasitic capacitances Cf1 and Cf2 may be formed by an internal conductor of the finger 40 and the stylus pen 10 (conductors connecting the coil 16 and elements of the stylus pen 10, etc.).

In FIG. 9, the parasitic capacitance Cf by the user's finger 40 is illustrated. That is, the resonance frequency of the stylus pen 10 is changed by the parasitic capacitance Cf. Then, a frequency of the driving signal 30 and a resonance frequency of the stylus pen 10 do not coincide, and thus a magnitude of the signal that is outputted from the stylus pen 10 decreases.

A stylus pen for preventing a change in resonance frequency due to a user's grip will be described with reference to FIG. 10.

Figure 10:
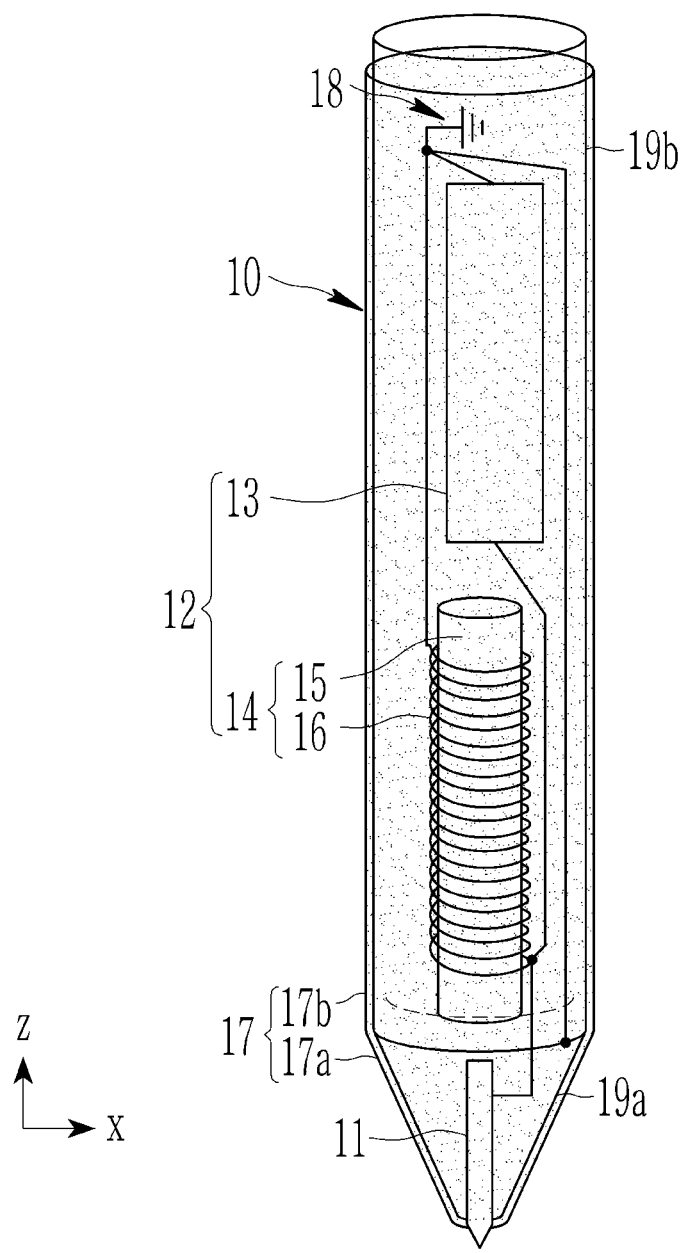
FIG. 10 illustrates a schematic view of a stylus pen.

FIG. 10 illustrates a schematic view of a stylus pen. A stylus pen 10 illustrated in FIG. 10 further includes a blocking member 17 as compared to the stylus pen 10 of FIG. 8.

The blocking member 17, which is a conductive member that surrounds at least a portion of the housing 19 or a conductive member that is at least a portion of the housing 19, may prevent formation of parasitic capacitance by a user's hand.

However, the blocking member 17 may generate an eddy current. This will be described with reference to FIG. 11A and FIG. 11B.

Figure 11B:
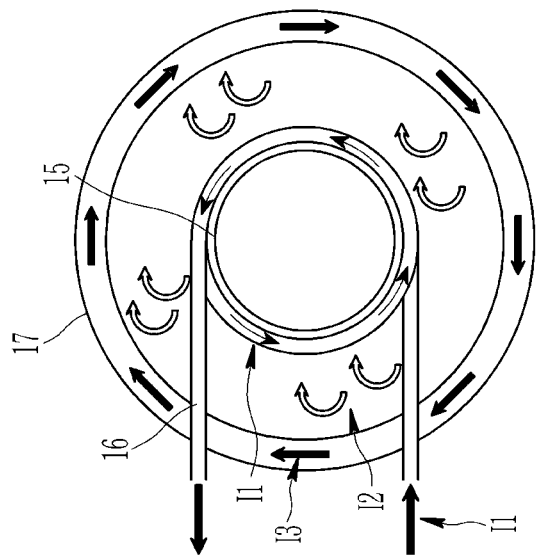
FIG. 11A and FIG. 11B illustrate exemplary diagrams showing an eddy current generated in the stylus pen illustrated in FIG. 10.
Figure 11A:
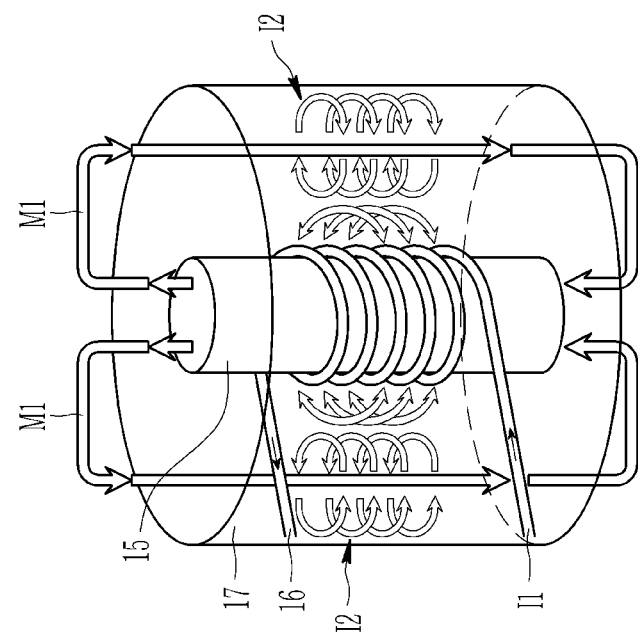

FIG. 11A and FIG. 11B illustrate exemplary diagrams showing an eddy current generated in the stylus pen illustrated in FIG. 10.

As illustrated in FIG. 11A, a current I1 flows through the coil 16 by a driving signal transferred from the conductive tip 11. A magnetic field M1 is formed by the current I1 flowing in the coil 16.

The magnetic field M1 forms a curent I2 in a predetermined direction in the blocking member 17. The curent I2 may be formed on a plane that is perpendicular to a direction of the magnetic field M1 generated by the inductor portion 140.

Curents I2 are combined to generate a clockwise eddy current 13 as illustrated in FIG. 11B.

The magnetic field M1 generated in the coil 16 is suppressed by this eddy current 13. Then, the inductance of the inductor portion 14 changes, and a problem occurs that the resonance frequency of the stylus pen 11 changes according to the change in inductance.

Exemplary embodiments provide a stylus pen that further prevents a change in a resonance frequency caused by a user's gripping and eddy current generation.

FIG. 12A to FIG. 12D, FIG. 13A to FIG. 13D, FIG. 14A to FIG. 14D, and FIG. 15A to FIG. 15D illustrate schematic views showing a structure of a stylus pen according to exemplary embodiments.

FIG. 12A to FIG. 12D illustrate stylus pens that prevent resonance signal transmission in a hovered stylus pen, FIG. 13A to FIG. 13D illustrate stylus pens for further preventing resonance signal transmission in a hovered stylus pen and a change in a resonance frequency clue to eddy current generation, and G. 14A to FIG. 14D, and FIG. 15A to FIG. 15D illustrate stylus pens which further prevent resonance signal transmission in a hovered stylus pen and a change in a resonance frequency due to user gripping and eddy current generation.

The stylus pen 100 of FIG. 12A to FIG. 12D, FIG. 13A to FIG. 13D, FIG. 14A to FIG. 14D, and FIG. 15A to FIG. 15D may include a conductive tip 110, a resonance circuit, a blocking member 170, a ground portion 180, and a housing 190. For convenience of description, although only the inductor portion 140 of the resonance circuit is illustrated in FIG. 12A to FIG. 12D, FIG. 13A to FIG. 13D, FIG. 14A to FIG. 14D, and FIG. 15A to FIG. 15D, the resonance circuit may include a capacitor portion, and the capacitor portion may be disposed inside the housing 190.

Referring to FIG. 12A to FIG. 12D, FIG. 13A to FIG. 13D, FIG. 14A to FIG. 14D, and FIG. 15A to FIG. 15D, the conductive tip 110 is electrically connected to the capacitor portion (not illustrated) and the inductor portion 140. For example, the conductive tip 110 is directly connected to the capacitor portion (not illustrated) and the inductor portion 140 by a conductive connection member 112 or the like.

All or part of the conductive tip 11 may be formed of a conductive material (e.g., a metal), or the conductive tip 11 may have a form in which a portion of the conductive tip 11 is exposed to an outside of a non-conductive housing while being present inside the non-conductive housing, but it is not limited thereto.

The conductive connection member 112, which is a conductive member, may be a wire, a wire, a pin, a rod, a bar, or the like, but the present invention is not limited thereto.

The capacitor portion (not illustrated) and the inductor portion 140 are disposed in the housing 190. The capacitor portion (not illustrated) may include a plurality of capacitors connected in parallel. The capacitors may have different capacitances, and may be trimmed in a manufacturing process. The inductor portion 140 may be disposed to be spaced apart from the conductive tip 110 by a first distance d1.

The housing 190 may accommodate elements of the stylus pen 100. Since the housing 190 is empty inside, the housing 190 may accommodate the conductive tip 110, the resonance circuit 12, and the ground portion 180 therein. The housing 190 may be made of a non-conductive material.

The housing 190 includes a holder portion 190a adjacent to the conductive tip 110 and a body portion 190b spaced apart from the conductive tip 110. The holder portion 190a and the body portion 190b may be integrally formed. Although the holder portion 190a and the body portion 190b are illustrated as being integrally coupled, the holder portion 190a and the body portion 190b may be separated.

The holder portion 190a may be in a form of a horn of FIG. 12A or a pillar of FIG. 12B. Alternatively, the holder portion 190a may have a pillar shape to which a dome 192 of FIG. 12C is coupled. Alternatively, the holder portion 190a may be in a form of a pipe of FIG. 12D.

The body portion 190b may have a cylindrical shape, a polygonal shape, a column shape having at least part of a shape of a curved surface, an entasis, a frustum of a pyramid, a circular truncated cone, or the like, but it is not limited thereto.

A blocking member 170a may be disposed to correspond to a portion of the housing in which the conductive tip 110 is exposed to the outside. For example, the blocking member 170a may be disposed within 0 mm to 20 mm from an opening of the holder portion 190a in which the conductive tip 110 is exposed to the outside. Specifically, the blocking member 170a may be disposed between the opening of the holder portion 190a and the portion spaced 20 mm from an opening of the holder portion 190a. In addition, the blocking member 170a may be disposed between a portion spaced 0.1 mm or more from the opening of the holder portion 190a and a portion spaced 10 mm from the opening of the holder portion 190a, or may be disposed between a portion spaced at least 1 mm from the opening of the holder portion 190a and a portion spaced 5 mm from the opening of the holder portion 190a. That is, the blocking member 170a may be disposed in an area that is adjacent to at least 20 mm from a portion of the housing in which the conductive tip 110 is exposed to the outside.

The blocking member 170a may be a conductive member surrounding at least a portion of the holder portion 190a. The blocking member 170a may be a conductive member that is at least part of the holder portion 190a. The blocking member 170a may be connected to the ground portion 180 through the conductive connection member 112. The blocking member 170a is electrically connected to the ground portion 180 to be grounded.

The blocking member 170a may be disposed inside or outside the holder portion 190a. Although the conductive tip 110 is illustrated in FIG. 12 as being disposed inside the holder portion 190a, when the conductive tip 110 extends into the body portion 190b, the blocking member 170a may also be disposed inside or outside the body portion 190b.

In addition, the blocking member 170a may surround at least a portion of the capacitor portion and the inductor portion 140 according to positions of the capacitor portion and the inductor portion 140. For example, when the capacitor portion and the inductor portion 140 are disposed inside the holder portion 190a, the blocking member 170a may surround at least a portion of the capacitor portion and the inductor portion 140.

As illustrated in FIG. 12, the blocking member 170a may have a form of one conductive plate when the inductor portion 140 is spaced apart from the blocking member 170a by a predetermined distance or more. In addition, the blocking member 170a may be a conductive coil inside the holder portion 190a. For example, the blocking member 170a may be a conductive coil wound while being in contact with the inside of the holder portion 190a.

The blocking member 170a is spaced apart from a ferrite core of the inductor portion 140 along a direction PD by a first distance d1. Even when the blocking member 170a is not formed of a plurality of blocking units, an influence of the magnetic field generated by the ferrite core of the inductor portion 140 is small.

In FIG. 12A, the blocking member 170a may have a form surrounding at least a portion of a side surface of the holder portion 190a having a horn shape. For example, the blocking member 170a may have a shape surrounding only a portion of the side surface of the horn-shaped holder portion 190a, which is adjacent to the tip 110.

In FIG. 12B, the blocking member 170a may have a form surrounding at least a portion of a side surface of the holder portion 190a having a pillar shape. For example, the blocking member 170a may have a shape surrounding only a portion of the side surface of the pillar holder portion 190a, which is adjacent to the tip 110.

In FIG. 12C, the blocking member 170a may have a form surrounding at least a portion of the side surface of the pillar-shaped holder portions 190a and an outer surface of the dome 192. For example, the blocking member 170a may have a shape surrounding only portions of the side surface of the pillar holder portion 190a and an outer surface of the dome 192, which are adjacent to the tip 110.

In FIG. 12D, the blocking member 170a may have a form surrounding at least a portion of an inner surface of the holder portion 190a having a pipe-shaped shape. For example, the blocking member 170a may have a shape surrounding only a portion of the inner surface of the pipe-shaped holder portion 190a, which is adjacent to the tip 110.

As illustrated in FIG. 13A to FIG. 13D, when the inductor portion 140 is spaced apart from the blocking member 170a by less than or equal to a second distance d2, which is shorter than the first distance d1, the blocking member 170a may include a plurality of first blocking units 171a. For example, the blocking member 170a may include a plurality of blocking units 171a spaced apart from each other while forming a closed loop in a circumferential direction of the holder portion 190a.

The first blocking units 171a extend in the direction PD that is perpendicular to the eddy current, that is, in a direction that is parallel to an axial direction PD of the ferrite core in the inductor portion 140, and are spaced apart from each other in a direction ED of the eddy current. The first blocking units 171a may be spaced apart from each other at an interval of 0.03 mm or more along the direction ED of the eddy current. Since the blocking member 170a includes first blocking units 171a spaced apart from each other along the direction ED of the eddy current, no eddy current can flow along the blocking member 170a, thereby blocking the generation of the eddy current. Although the first blocking units 171a have been described as extending along the direction PD that is perpendicular to the eddy current, the first blocking units 171a may extend along the direction inclined at a predetermined angle (more than 0 degrees and less than 90 degrees) to the direction PD.

The first blocking units 171a are electrically connected to each other through a connector 174a. In addition, the connector 174a may be electrically connected to the ground portion 180. That is, the first blocking units 171a may be connected to the ground portion 180 through the conductive connection member 112. The blocking member 170a is electrically connected to the ground portion 180 to be grounded.

In FIG. 13A, the blocking member 170a may have a form surrounding at least a portion of a side surface of the holder portion 190a having a horn shape. For example, the blocking member 170a may have a shape surrounding only a portion of the side surface of the horn-shaped holder portion 190a, which is adjacent to the tip 110.

In FIG. 13B, the blocking member 170a may have a form surrounding at least a portion of a side surface of the holder portion 190a having a pillar shape. For example, the blocking member 170a may have a shape surrounding only a portion of the side surface of the pillar holder portion 190a, which is adjacent to the tip 110.

In FIG. 13C, the blocking member 170a may have a form surrounding at least a portion of the side surface of the pillar-shaped holder portions 190a and an outer surface of the dome 192. For example, the blocking member 170a may have a shape surrounding only portions of the side surface of the pillar holder portion 190a and an outer surface of the dome 192, which are adjacent to the tip 110.

In FIG. 13D, the blocking member 170a may have a form surrounding at least a portion of an inner surface of the holder portion 190a having a pipe shape. For example, the blocking member 170a may have a shape surrounding only a portion of the inner surface of the pipe-shaped holder portion 190a, which is adjacent to the tip 110.

The stylus pen 100 illustrated in FIG. 14A to FIG. 14D further includes a blocking member 170b as compared to the stylus pen 100 illustrated in FIG. 12A to FIG. 12D. The stylus pen 100 illustrated in FIG. 15 further includes a blocking member 170b as compared to the stylus pen 100 illustrated in FIG. 13. The blocking member 170b includes a conductive member surrounding the inductor portion 140. The blocking member 170b may include a plurality of first blocking units 171b. For example, the blocking member 170b may include a plurality of blocking units 171b spaced apart from each other while forming a closed loop in a circumferential direction of the body portion 190b.

The blocking member 170b may be disposed inside or outside the body portion 190b to surround at least a portion of the inductor 140. Although the inductor portion 140 is illustrated in FIG. 14 as being disposed inside the body portion 190b, when the inductor portion 140 extends into the holder portion 190a, the blocking member 170b may be disposed inside or outside the holder portion 190a.

The first blocking units 171b extend in the direction PD that is perpendicular to the eddy current, that is, in a direction that is parallel to an axial direction PD of the ferrite core in the inductor portion 140, and are spaced apart from each other in a direction ED of the eddy current. Since the blocking member 170b includes the first blocking units 171b spaced apart from each other along the direction ED of the eddy current, no eddy current can flow along the blocking member 170b, thereby blocking the generation of the eddy current. Although the first blocking units 171b have been described as extending along the direction PD that is perpendicular to the eddy current, the first blocking units 171a may extend along the direction inclined at a predetermined angle (more than 0 degrees and less than 90 degrees) to the direction PD.

The blocking member 170a and the blocking member 170b may be electrically connected to each other. For example, the blocking member 170a and the first blocking units 171b are electrically connected at a boundary between the holder portion 190a and the body portion 190b. The first blocking units 171b are electrically connected to each other through a connector 174b. The connector 174b may be electrically connected to the ground portion 180. That is, the first blocking units 171b may be connected to the ground portion 180 through the conductive connection member 112. Both the blocking member 170a and the blocking member 170b are electrically connected to the ground unit 180 to be grounded.

FIG. 16A to FIG. 16C and FIG. 17A to FIG. 17C illustrate schematic views showing a structure of a blocking member of a stylus pen according to exemplary embodiments.

Figure 16C:
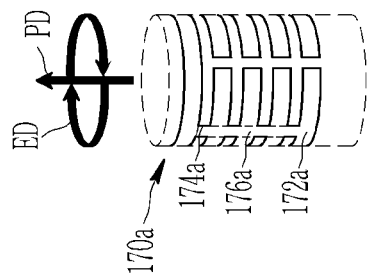
FIG. 16A to FIG. 16C and FIG. 17A to FIG. 17C illustrate schematic views showing a structure of a blocking member of a stylus pen according to exemplary embodiments.
Figure 16B:
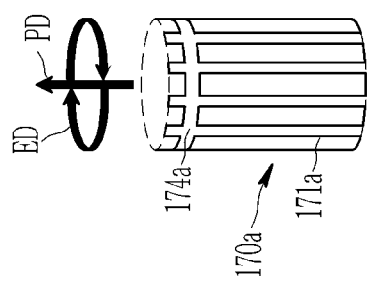
Figure 16A:
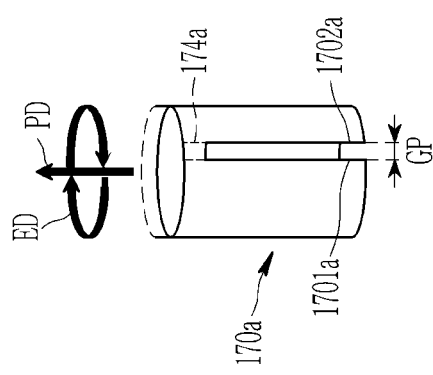

As illustrated in FIG. 16A to FIG. 16C, opposite ends of the blocking member 170a are spaced apart along the direction ED of the eddy current. The blocking member 170a may be printed on a sheet by plating, photolithography, sputtering, or the like to be attached to the holder portion 190a, or may be printed on the holder portion 190a by a method such as plating, photolithography, thin film deposition, or the like, but the present invention is not limited thereto.

Referring to FIG. 16A, the blocking member 170a includes one slit GP for blocking generation of an eddy current, and a connector 174a for connecting opposite ends 1701a and 1702a of the blocking member 170a. The slit GP extends along the direction PD that is perpendicular to the eddy current. The opposite ends 1701a and 1702a of the blocking member 170a are spaced apart from each other by the slit GP. The opposite ends 1701a and 1702a of the blocking member 170a are spaced apart along the direction ED of the eddy current. The connector 174a may connect the opposite ends 1701a and 1702a of the blocking member 170a.

Referring to FIG. 16B, the blocking member 170a includes a plurality of first blocking units 171a and a connector 174a connecting the first blocking units 171a to each other. The first blocking units 171a extend along the direction PD that is perpendicular to the eddy current, and are spaced apart from each other along the direction ED of the eddy current. The connector 174a may connect the first blocking units 171a.

Referring to FIG. 16C, the blocking member 170a includes a plurality of second blocking units 172a and connectors 174a and 176a connecting the second blocking units 172a.

The second blocking units 172a are spaced apart along the direction PD that is perpendicular to the eddy current, and opposite ends of each of the second blocking units 172a are spaced apart from each other along the direction ED of the eddy current. The connector 176a extends along the direction PD that is perpendicular to the eddy current, and may connect the second blocking units 172a.

Figure 17A:
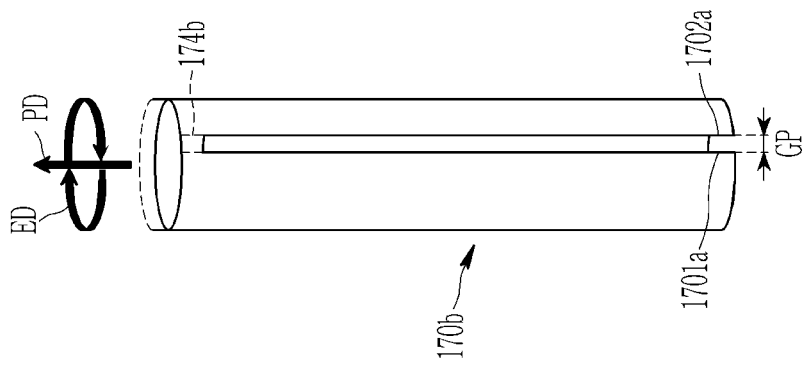
Figure 17B:
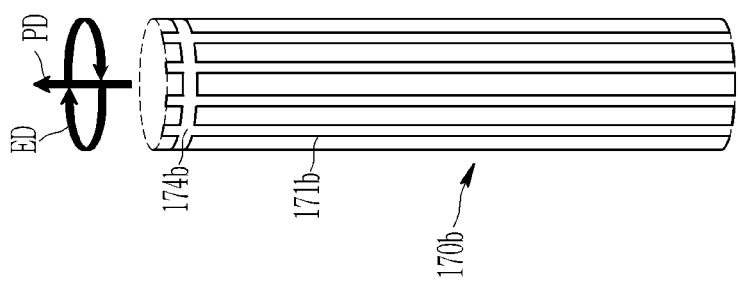
Figure 17C:
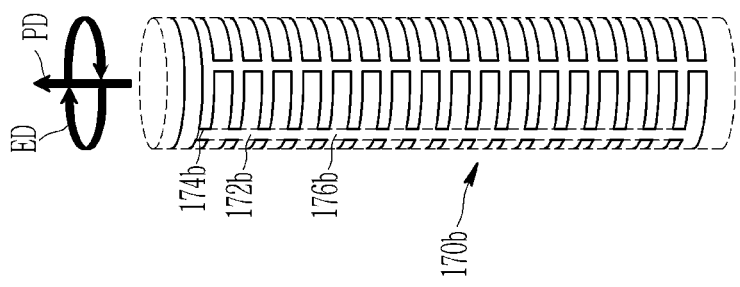

As illustrated in FIG. 17A to FIG. 17C, opposite ends of the blocking member 170b are spaced apart along the direction ED of the eddy current. The blocking member 170b may be printed on a sheet by plating, photolithography, sputtering, or the like to be attached to the body portion 190b, or may be printed on the body portion 190b by a method such as plating, photolithography, thin film deposition, or the like, but the present invention is not limited thereto.

Referring to FIG. 17A, the blocking member 170b includes one slit GP for blocking generation of an eddy current, and a connector 174b for connecting opposite ends 1701b and 1702b of the blocking member 170b. The slit GP extends along the direction PD that is perpendicular to the eddy current. The opposite ends 1701b and 1702b of the blocking member 170b are spaced apart from each other by the slit GP. The opposite ends 1701b and 1702b of the blocking member 170b are spaced apart along the direction ED of the eddy current. The connector 174b may connect the opposite ends 1701b and 1702b of the blocking member 170b.

Referring to FIG. 17B, the blocking member 170b includes a plurality of first blocking units 171b and a connector 174b connecting the first blocking units 171b to each other. The first blocking units 171b extend along the direction PD that is perpendicular to the eddy current, and are spaced apart from each other along the direction ED of the eddy current. The connector 174b may connect the first blocking units 171b.

Referring to FIG. 17C, the blocking member 170b includes a plurality of second blocking units 172b and connectors 174b and 176b connecting the second blocking units 172b.

The second blocking units 172b are spaced apart along the direction PD that is perpendicular to the eddy current, and opposite ends of each of the second blocking units 172b are spaced apart from each other along the direction ED of the eddy current. The connector 176b extends along the direction PD that is perpendicular to the eddy current, and may connect the second blocking units 172b.

Figure 18A:
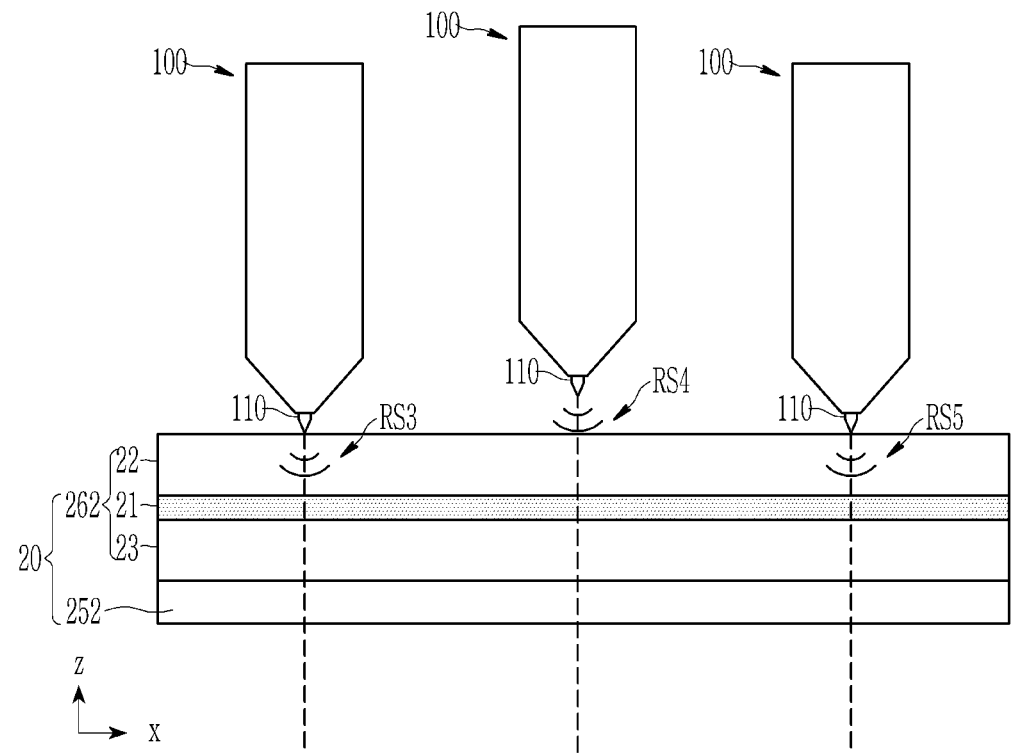
FIG. 18A and FIG. 18B illustrates a touch input by hovering a stylus pen according to exemplary embodiments.
Figure 18B:
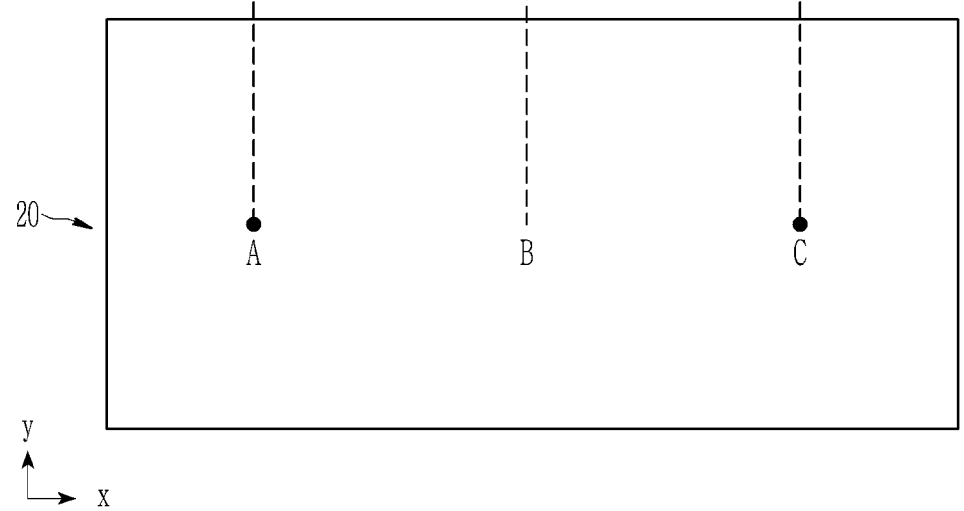

FIG. 18A and FIG. 18B illustrate touch inputs by hovering a stylus pen according to exemplary embodiments. As described in FIG. 7A and FIG. 7B, in writing, the stylus pen 100 may move from the end point A of the previous stroke to the start point C of the next stroke in the touch screen 20 to write the next stroke with the previous stroke.

The conductive tip 110 of the stylus pen 100 contacts the window 22 at one point (first point) A and also contacts the window 22 at another point (second point) C. Resonance signals RS3 and RS5 from the conductive tip 110 which is in contact with the window 22 may be transferred to the touch electrode 21. Touch data corresponding to the first point A is generated by the resonance signal RS3, and touch data corresponding to the second point C is generated by the resonance signal RS5.

The stylus pen 100 is spaced apart from the window 22 in a region B between the first point A and the second point B. That is, the stylus pen 100 is hovered in the area B. In a hovering state, the resonance signal RS4 from the conductive tip 110 of the stylus pen 100 according to the exemplary embodiment is transferred to the touch electrode 21 at a very small value, or not at all. The touch controller 262 does not generate touch data caused by the resonance signal RS4. That is, touch data corresponding to the connection stroke NL of the area B is not generated.

According to at least one of the exemplary embodiments, it is possible to provide a stylus pen that prevents unintentional touch input caused by the hovered stylus pen.

According to at least one of the exemplary embodiments, it is possible to provide a stylus pen that is robust against external factors such as a user's grip.

According to at least one of the exemplary embodiments, an inductance value and a capacitance value of the stylus pen can be kept constant, and thus the resonance frequency may be kept constant, thereby improving touch sensitivity of the touch sensor.

Next, a positional relationship between the blocking member 170 and the housing 190 will be described with reference to FIG. 19 to FIG. 21.

FIG. 19A, FIG. 19B, FIG. 20A, FIG. 20B, FIG. 21A, and FIG. 21B illustrate schematic views showing a structure of a body portion of a stylus pen according to exemplary embodiments.

Figure 19B:
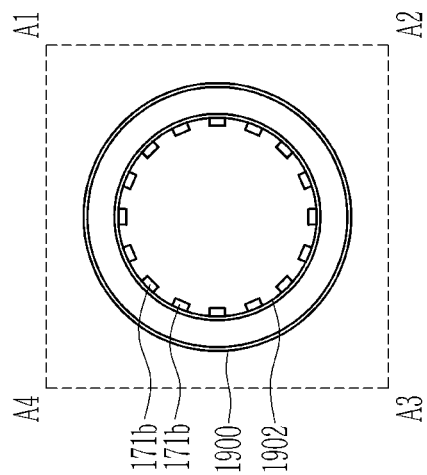
FIG. 19A, FIG. 19B, FIG. 20A, FIG. 20B, FIG. 21A, and FIG. 21B illustrate schematic views showing a structure of a housing of a stylus pen according to exemplary embodiments.
Figure 19A:
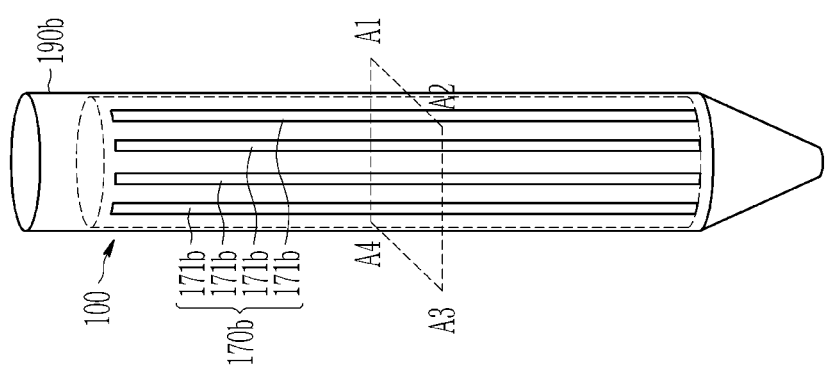

First, referring to FIG. 19A, a stylus pen 100 includes a blocking member 170b including a plurality of first blocking units 171b and a body portion 190b.

FIG. 19B illustrates a cross-section of the stylus pen 100 cut along cut surfaces A1, A2, A3, and A4. According to an exemplary embodiment, the first blocking units 171b may be disposed on an inner surface 1902 of the body portion 190b.

Figure 20B:
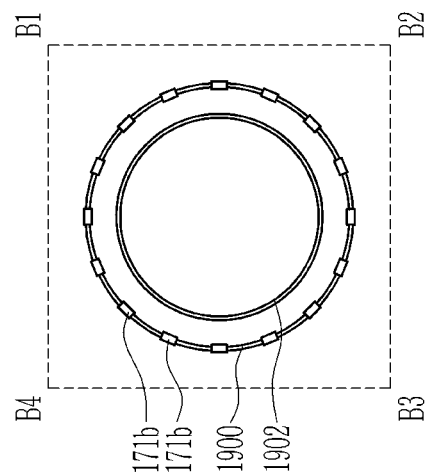
Figure 20A:
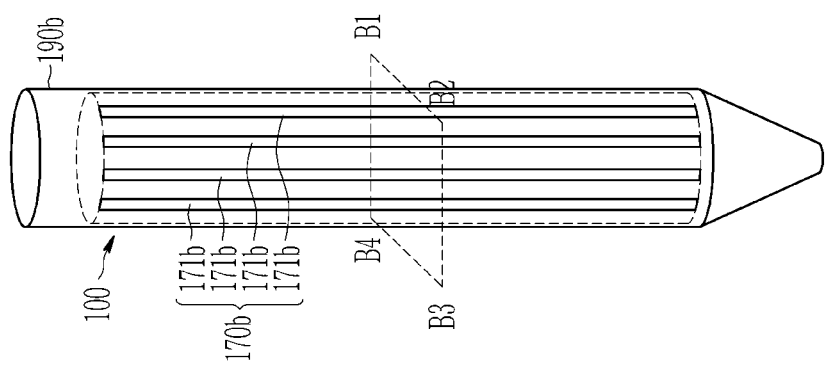

Next, referring to FIG. 20A, a stylus pen 100 includes a blocking member 170b including a plurality of first blocking units 171b and a body portion 190b.

FIG. 20B illustrates a cross-section of the stylus pen 100 cut along cut surfaces B1, B2, B3, and B4. According to an exemplary embodiment, the first blocking units 171b may be disposed on an outer surface 1900 of the body portion 190b.

Figure 21B:
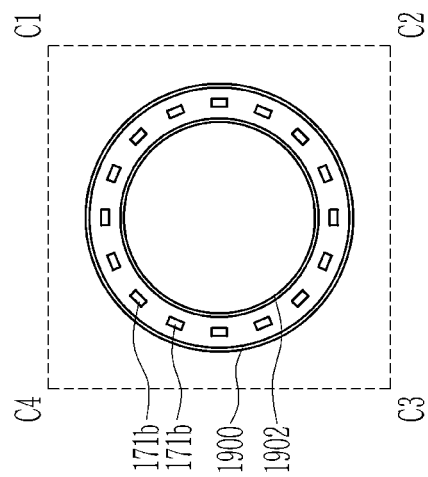
Figure 21A:
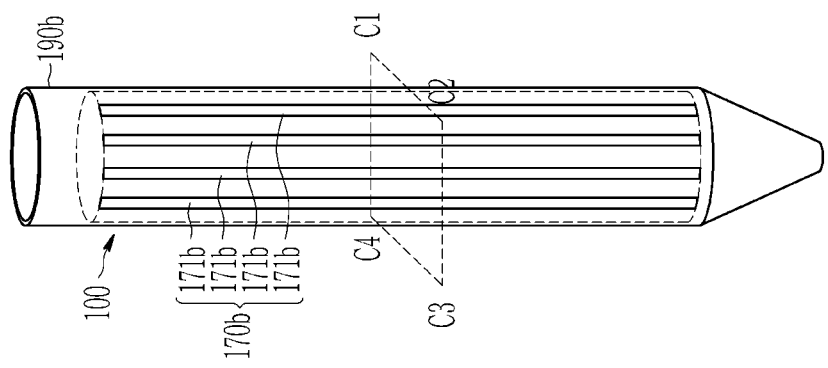

Finally, referring to FIG. 21A, a stylus pen 100 includes a blocking member 170b including a plurality of first blocking units 171b and a body portion 190b.

FIG. 21B illustrates a cross-section of the stylus pen 100 cut along cut surfaces C1, C2, C3, and C4. According to an exemplary embodiment, the first blocking units 171b may be disposed between the outer surface 1900 and the inner surface 1902 of the body portion 190b.

Although only the blocking member 170b has been described in FIG. 19 to FIG. 21, the blocking member 170a may also be disposed on the inner surface of the holder portion 190a, may be disposed on the outer surface thereof, or may be embedded between the outer surface and the inner surface.

The above detailed description should not be construed as limiting in all aspects and should be considered as illustrative. The scope of the present invention should be determined by reasonable interpretation of the appended claims, and all changes within the equivalent range of the present invention are included in the scope of the present invention.

What is claimed is:

1. A stylus pen comprising:
a housing;
a conductive tip configured to have at least a portion that is exposed to an exterior of the housing;
a ground portion configured to be electrically connected to a user;
a resonance circuit comprising an inductor portion and a capacitor portion and disposed in the housing to be connected to the conductive tip and to resonate an electrical signal transferred from the conductive tip;
a first conductive blocking member disposed between a first area 0.1 mm away from an opening of the housing where the conductive tip is exposed to the outside and a second area 20 mm away from the opening, and electrically connected to the ground portion;
a second conductive blocking member surrounding at least a portion of the inductor portion and including a plurality of blocking units spaced apart from each other along a first direction in which an eddy current is generated and extending along a second direction perpendicular to the first direction,
wherein the first conductive blocking member is a single conductive plate and is electrically connected to the ground portion via at least one of the blocking units.

2. The stylus pen of claim 1,
wherein
the inductor portion is connected between the conductive tip and the ground portion, and
the capacitor portion is connected between the conductive tip and the ground portion.

3. The stylus pen of claim 1, wherein
the inductor portion includes:
a ferrite core; and
a conductive coil connected to the conductive tip and wound around the ferrite core.

4. The stylus pen of claim 1, wherein
the first and second blocking members are disposed on an inner surface of the housing.

5. The stylus pen of claim 1, wherein
the first and second blocking members are disposed on an outer surface of the housing.

6. The stylus pen of claim 1, wherein
the first and second blocking members are disposed between the inner and outer surfaces of the housing.

7. The stylus pen of claim 1, wherein
each of the first and second blocking members includes a sheet in which a plurality of conductive blocking units are printed.

8. The stylus pen of claim 1, wherein
each of the first and second blocking members includes a plurality of blocking units plated on the housing.

* * * * *